United States Patent

[11] 3,607,327

| | | | |
|---|---|---|---|
| [72] | Inventor | Louis George Imperato, Jr. Tenafly, N.J. | |
| [21] | Appl. No. | 809,020 | |
| [22] | Filed | Mar. 20, 1969 | |
| [45] | Patented | Sept. 21, 1971 | |
| [73] | Assignee | Blocked Iron Corporation Albany, N.Y. | |

[54] METHODS AND COMPOSITION FOR THE MANUFACTURE OF PORTLAND CEMENT
6 Claims, No Drawings

[52] U.S. Cl. ...................................... 106/100, 106/89, 106/103
[51] Int. Cl. ...................................... C04b 7/48, C04b 7/38
[50] Field of Search ........................... 106/100, 89, 103

[56] References Cited
UNITED STATES PATENTS

| | | | |
|---|---|---|---|
| 3,127,455 | 3/1964 | Culbertson et al............ | 106/100 |
| 2,860,061 | 11/1958 | Heilmann..................... | 106/100 |
| 2,769,719 | 11/1956 | DeVaney...................... | 106/89 |
| 2,627,399 | 2/1953 | DeVaney...................... | 106/100 |
| 1,784,840 | 12/1930 | LaForge....................... | 106/100 |
| 1,017,211 | 2/1912 | Hill.............................. | 106/100 |

*Primary Examiner*—Tobias E. Levow
*Assistant Examiner*—W. T. Scott
*Attorney*—Buell, Blenko & Ziesenheim ABSTRACT: A cement kiln feed material and method of operating a cement kiln are provided in which a kiln feed material comprising about 80–85 percent limestone, 10–14 percent of shale, clay or bentonite, 5 to 8 percent carbonaceous material and a member from the group consisting of oxides and hydroxides of alkaline earth metals are mixed with sufficient water to form lumps, dried to a moisture level below about 10 percent and reacted with carbon dioxide to form alkaline earth carbonates in situ and feeding the formed lumps into a kiln at high temperature and reacting the same to form a cement clinker.

METHODS AND COMPOSITION FOR THE MANUFACTURE OF PORTLAND CEMENT

This invention relates to methods and compositions for the manufacture of Portland cement and particularly to a method of continuous cement manufacture. It has long been the practice to pelletize or nodulize material going into the cement kiln. Generally the feed consists of pellets of limestone and shale or clay which are fed along with anthracite coal as separate materials into a kiln. The materials are dried in the upper part of the kiln, reacted in the middle part of the kiln, and cooled and heat exchanged in the lower part of the kiln. The operation of such kilns in a continuous fashion has been plagued with problems, particularly the pellets or nodules exploding or disintegrating producing an excessive amount of fines in the furnace and drastically restricting the production from such kilns. Many efforts have been made to overcome this problems, as for example, by the substitution of various materials in the pellets for the shale and clay. Among the materials, bentonite has been substituted and various sizes and shapes have been tried for the pellets or nodules and various other modifications of the system have been attempted in order to overcome these problems, but without success.

I have discovered a new composition and method of operating a cement kiln which overcomes these problems and which more than doubles the feed and product rate of a given kiln. For example, my invention will increase the amount of product from a kiln which normally produces 600 barrels of cement per day up to about 1200 barrels per day or double the standard output from the same kiln without any serious problems of feed or handling in the kiln and with the elimination of those problems which have been characteristic of the operation of such kilns heretofore.

I preferably provide a cement kiln feed made up of a mixture of about 80 to 85 percent limestone, 10 to 14 shale and about 5 to 8 percent anthracite coal which is mixed with about 2 to 6 percent of an oxide or hydroxide of an alkaline earth metal such as for example dolomitic hydrate and with sufficient water to form pellets. The resulting mixture is formed into pellets, dried to reduce the moisture content below 10 percent, treated with carbon dioxide and then used as a feed for a cement kiln. The method of operating the cement kiln consists in the steps of forming pellets from the composition above described, subjecting the same to carbon dioxide to form a dolomitic carbonate in situ and thereafter continuously charging the formed pellets into the feed end of a cement kiln, heating the same to calcination temperature, then burning or sintering, cooling and discharging the resulting product as a finished cement clinker.

The invention can perhaps best be understood by reference to the following examples which demonstrate the practice of my invention in the manufacture of cement clinkers.

In order to compare the pellets of this invention with a similar material pelletized according to prior art practices, I prepared samples using the prior art practices which appear under example I and like material pelletized according to my invention which appear under example II.

EXAMPLE I

Control Sample—Cement Kiln Feed Pellets—No Binder
Description of Preparation

Approximately 20 pounds of a finely ground (88percent-200M) mixture composed of 83 percent limestone, 11 percent shale and 6 percent anthracite coal was mixed with 17 percent (by weight) water and formed into moist balls nominally sized to three-eighths inch by five-eighths inch.

The balls were then equally divided into six groups and each group dried to the indicated moisture content before being subjected to destructive forces to determine strengths. The test results appear in table I.

TABLE I

| Pellet Moisture Content, % by weight, dry basis | Compression Test, Average Load in pounds required to fracture a 13/32" by 3/8" individual ball |
| --- | --- |
| 16.96 | 1.75 |
| 11.11 | 3.26 |
| 9.17 | 4.34 |
| 6.96 | 3.70 |
| 1.01 | 1.79 |
| 0.00 | 2.12 |

EXAMPLE II

Carbonate-Bonded Cement Kiln Feed Pellets
Description of Preparation

Approximately 40 pounds of the finely ground (88percent-200M) cement kiln feed material mixture (83 percent limestone, 11 percent shale and 6 percent anthracite coal) was mixed with (4 percent by weight) dolomitic hydrate, then remixed with nearly 17 percent (by weight) water. The resultant wet mixture was then formed into nominally sized five-eighth inch by three-eighth inch balls.

The wet balls were then equally divided into five groups and each group dried to the indicated moisture content. Twenty balls were removed from each dried group and subjected to destructive testing. The remainder of the groups were placed in a container and treated with carbon dioxide gas. Twenty additional carbonated pellets were then removed from each group and subjected to the same destructive testing as the tried uncarbonated pellets. The results appear in Table II.

TABLE II

| Pellet moisture content, percent by weight, dry basis | Compression test [1] Not treated with carbon dioxide | Treated with carbon dioxide |
| --- | --- | --- |
| 16.50 | 2.42 | ([2]) |
| 8.33 | 5.96 | 27.0 |
| 7.22 | 4.51 | 34.0 |
| 4.47 | 4.13 | 41.0 |
| 2.80 | 3.26 | 37.0 |

[1] Average load in pounds required to fracture a 13/32" by 3/8" individual ball.
[2] Not treated.

EXAMPLE III

The pellets for this series of tests were produced using the same preparation, techniques, compositions and quantities used in example II with the exception that the dolomitic hydrate was 3 percent by weight. The test results are given in Table III.

TABLE III

| Pellet moisture content, percent by weight, dry basis | Compression test [1] Not treated with carbon dioxide | Treated with carbon dioxide |
| --- | --- | --- |
| 16.96 | 1.96 | ([2]) |
| 9.30 | 4.21 | 9.2 |
| 8.39 | 4.64 | 24.6 |
| 3.81 | 5.36 | 22.8 |
| 2.79 | 3.68 | 28.8 |

[1] Average load in pounds required to fracture a 13/32" by 3/8" individual ball.
[2] Not treated.

EXAMPLE IV

The pellets for this series of tests were produced using the same preparation, techniques, compositions and quantities used in Example II with the exception that the dolomitic hydrate was 2 percent by weight and the test series consisted of four groups. The test results are given in table IV.

TABLE IV

| Pellet moisture content, percent by weight, dry basis | Compression test [1] | |
|---|---|---|
| | Not treated with carbon dioxide | Treated with carbon dioxide |
| 17.10 | 1.88 | [2] |
| 7.84 | 4.01 | 13.0 |
| 7.16 | 4.38 | 14.0 |
| 2.20 | [3] | 18.0 |

[1] Average load in pounds required to fracture a 13/32" by 3/8" individual ball.
[2] Not treated.
[3] Not tested.

A vertical shaft circular refractory lined, steel cased cement kiln 30 foot high by 10 foot in diameter at the top and tapering to 9 foot in diameter at the bottom was used for manufacturing cement clinkers. The kiln has been in operation for several years manufacturing cement clinkers from a feed pellet similar to that of example I with 13 percent water and 3 sulfate liquor as a binder. The feed size of pellets generally ran in the range one-eighth inch to three-fourth inch. The optimum kiln residence time for ordinary operation of the kiln has been approximately 8 hours. The kiln continuously discharges product cement clinkers at the bottom through a movable grate. The cement clinkers passing through the grate are discharged through a three chamber lock.

Ambient air is supplied from two bustle pipes into the kiln at or close to the discharge grate. The volume was indicated at 115–120 cubic meters per minute of air (4000–4200 CFM). The kiln internal atmosphere pressure is 0.8×1000 which 800 mm. $H_2O$ or 31.5 inches of $H_2O$. 31.5×0.036090=1.137 p.s.i. Maximum bed temperature is believed to be 2650° F. and takes place in the sintering zone about half way down.

Above the sintering zone is the calcining zone where $CO_2$ is driven off from the limestone. Above the calcining zone is a drying zone. The lower half of the kiln serves for cooling and heat recovery.

Design capacity of this kiln is 1000 barrels per 24 hour day. However, it has never produced more than 600–700 barrels per day.

This same kiln operated on the pellets of example II–IV will produce in excess of 1000 barrels of cement per day on a consumption of 250 tons of feed material, an improvement of almost 100 percent over the prior art practices.

While I have described a presently preferred embodiment and practice of my invention, it will be understood that this invention may be otherwise embodied within the scope of the following claims.

I claim:

1. A Portland cement kiln lump feed material consisting essentially of about 80 to 85 percent limestone, 10 to 14 percent of a member selected from the group consisting of shale, clay and bentonite and about 5 to 8 percent of carbonaceous material from the group consisting of coal, coke, graphite, coke breeze and charcoal bonded together with an alkaline earth carbonate formed in situ from the reaction of carbon dioxide and about 2 percent to 6 percent of one of the group consisting of oxides and hydroxides of alkaline earth metals, in the presence of less than 10 percent moisture.

2. A Portland cement kiln feed material as claimed in claim 1 wherein the alkaline earth metal oxide is dolomitic hydrate.

3. A Portland cement kiln feed material as claimed in claim 1 wherein the carbonaceous material is anthracite coal.

4. A Portland cement kiln feed material as claimed in claim 2 wherein the carbonaceous material is anthracite coal.

5. A method of operating a cement kiln comprising the steps of:

a. forming a lump feed product of a mixture of about 80 to 85 percent limestone, 10 to 14 percent of a member selected from the group consisting of shale, clay and bentonite and about 5 to 8 percent of carbonaceous material from the group consisting of coal, coke, graphite, coke breeze and charcoal and adding to said mixture about 2 to 6 percent of a member from the group oxides and hydroxides of alkaline earth metals in the presence of sufficient water to form agglomerates,
   b. reducing the moisture content of the product below 10 percent,
   c. contacting said formed lumps with carbon dioxide to form carbonates in situ in said lumps,
   d. feeding said formed lumps containing carbonates in situ into a cement kiln, and
   e. passing said lumps through said kiln to form a cement clinker.

6. A method as claimed in claim 5 wherein the formed lumps are contacted with carbon dioxide to form carbonates in situ in said lumps in the upper end of a cement kiln.